United States Patent
Nagasaka et al.

(10) Patent No.: US 6,697,090 B1
(45) Date of Patent: Feb. 24, 2004

(54) DEVICE CONTROLLER, METHOD OF DISPLAYING USER INTERFACE, AND RECORDING MEDIUM IN WHICH COMPUTER PROGRAM FOR DISPLAYING USER INTERFACE IS RECORDED

(75) Inventors: Fumio Nagasaka, Nagano-ken (JP); Yutaka Hisamatsu, Nagano-ken (JP); Toshiharu Katada, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 527 days.

(21) Appl. No.: 09/676,810

(22) Filed: Oct. 2, 2000

Related U.S. Application Data

(63) Continuation of application No. PCT/JP00/00687, filed on Feb. 8, 2000.

(30) Foreign Application Priority Data

Feb. 9, 1999 (JP) .......................................... 11-031649

(51) Int. Cl.⁷ ................................................ G09G 5/00
(52) U.S. Cl. ...................... 345/769; 345/804; 345/805; 345/835
(58) Field of Search ................................ 345/700, 804, 345/853, 805

(56) References Cited

U.S. PATENT DOCUMENTS

| | | | | |
|---|---|---|---|---|
| 5,740,436 A | * | 4/1998 | Davis et al. | 713/1 |
| 5,745,112 A | * | 4/1998 | Hirose | 345/769 |
| 5,956,030 A | * | 9/1999 | Conrad et al. | 345/769 |
| 6,020,888 A | * | 2/2000 | Ho | 345/835 |
| 6,104,334 A | * | 8/2000 | Allport | 341/175 |
| 6,134,674 A | * | 10/2000 | Akasheh | 714/33 |
| 6,240,167 B1 | * | 5/2001 | Michaels | 379/106.03 |
| 6,359,892 B1 | * | 3/2002 | Szlam | 370/401 |
| 6,433,800 B1 | * | 8/2002 | Holtz | 345/835 |

FOREIGN PATENT DOCUMENTS

| | | |
|---|---|---|
| JP | 9-223097(w/abstract) | 8/1997 |
| JP | 9-305337(w/abstract) | 11/1997 |
| JP | 10-285580 w/abstract | 10/1998 |
| JP | 11-334180 w/absrtact | 12/1999 |
| WO | WO 94/29787 | 12/1994 |

* cited by examiner

*Primary Examiner*—Kristine Kincaid
*Assistant Examiner*—Nhon (Gary) D Nguyen
(74) *Attorney, Agent, or Firm*—Oliff & Berridge, PLC

(57) ABSTRACT

When a user drags and drops a digital camera category icon 705 onto a printer category icon 702, an application unit 112 detects the drag and drop action (S106). The application unit 112 gains access to a server 400 (S108), and obtains data regarding the names of individual digital cameras and the names of individual printers present on a network 500 and corresponding icons, out of pieces of information stored in a common database 410 (S110). The application unit 112 subsequently opens a digital camera category window 601 and a printer category window 602 on a screen 182 of a monitor 180, based on the obtained data, and causes device icons of the digital cameras and device icons of the printers to be displayed simultaneously but separately in the window 601 and in the window 602 (step S112). This arrangement ensures the user good usability and operatability when the user requires some operation between an arbitrary set of devices.

10 Claims, 10 Drawing Sheets

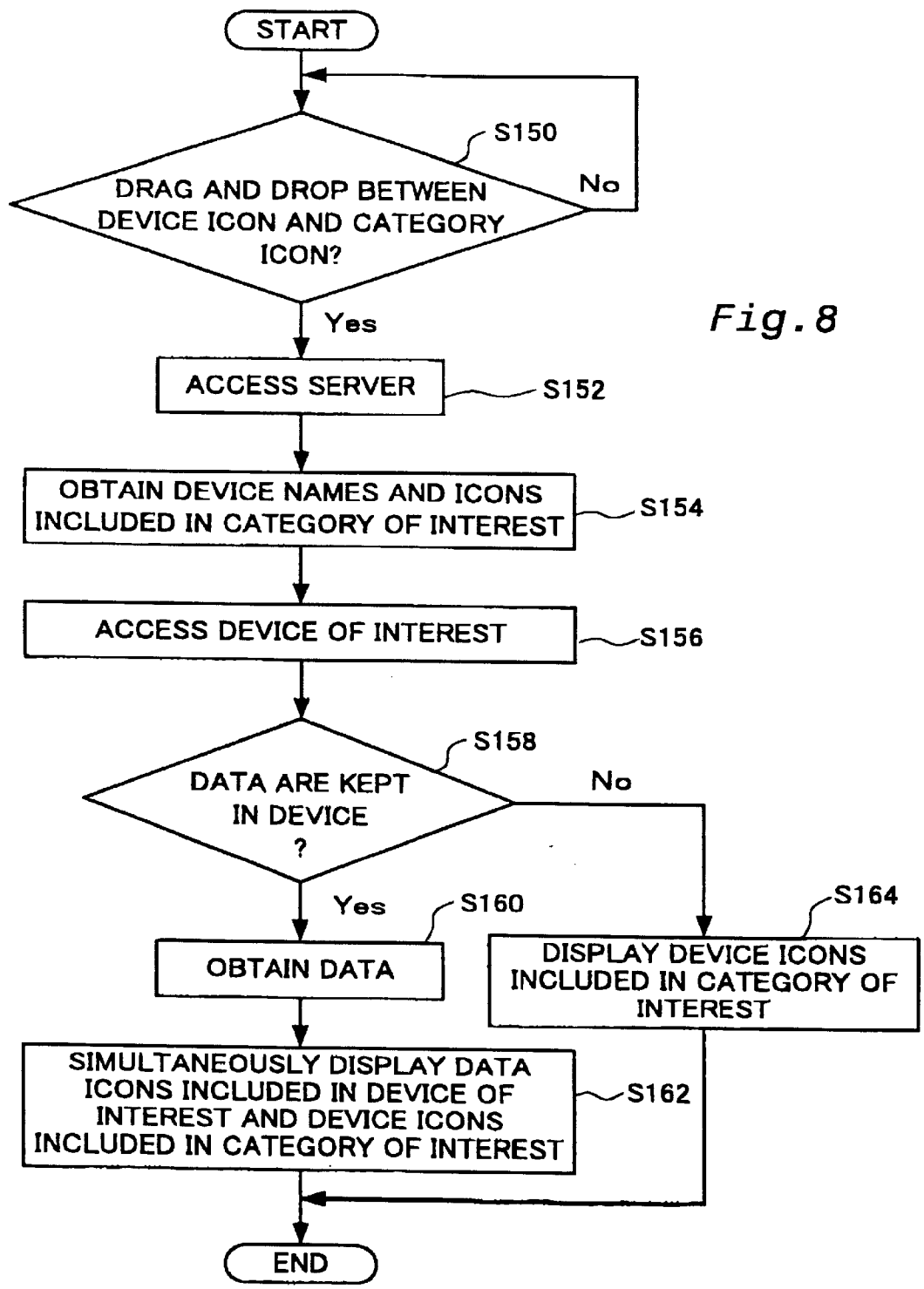

DEVICE CONTROLLER, METHOD OF DISPLAYING USER INTERFACE, AND RECORDING MEDIUM IN WHICH COMPUTER PROGRAM FOR DISPLAYING USER INTERFACE IS RECORDED

This is a Continuation of application Ser. No. PCT/JP00/00687 filed Feb. 8, 2000. The entire disclosure of the prior application is hereby incorporated by reference herein in its entirety.

TECHNICAL FIELD

The present invention relates to a technique that displays a user interface to enable operation of a device.

BACKGROUND ART

In Window 95 and Window NT that are operating systems manufactured by Microsoft Corporation, for example, a user locates a mouse cursor onto an icon of a printer folder, which is displayed on a screen of a monitor connecting with a computer, with a mouse and double clicks a mouse button. The double-click newly opens a window of the printer folder on the screen and enables icons representing a plurality of accessible printers connecting with the computer directly or via a network to be displayed in the window. The user then locates the mouse cursor onto an icon of desired image data separately displayed on the screen with the mouse, drags the icon, and drops the dragged icon onto an icon of a desired printer among the displayed icons representing the plurality of printers. This drag and drop action gives an instruction to the computer to start printing the desired image data with the printer.

The prior art technique, however, does not practically provide a user interface as discussed above with regard to devices other than printers. When the user requires data transmission between an arbitrary set of devices, the prior art technique should implement the data transmission via an application software that processes data. This is extremely inconvenient.

The object of the present invention is thus to solve the problems of the prior art technique and to provide a device controller, a method of displaying a user interface, and a recording medium for displaying a user interface, which ensures the user good usability and operatability when the user requires some operation between an arbitrary set of devices.

DISCLOSURE OF THE INVENTION

At least part of the above and the other related objects is attained by a first device controller that is capable of controlling at least one first device included in a first category and at least one second device included in a second category. The first device controller includes: an input unit that inputs an external instruction; and a user interface display control unit that causes a first category symbol corresponding to the first category and a second category symbol corresponding to the second category to be displayed on a screen of a display unit. The user interface display control unit causes a first device symbol corresponding to each of the at least one first device included in the first category and a second device symbol corresponding to each of the at least one second device included in the second category to be displayed substantially simultaneously but separately in a first area and in a second area on the screen, in response to an external instruction that is input via the input unit to associate the displayed first category symbol with the displayed second category symbol.

The present invention is also directed to a first method of displaying a user interface on a screen of a display unit to enable operation of at least one first device included in a first category and at least one second device included in a second category. The first method includes the steps of: (a) causing a first category symbol corresponding to the first category and a second category symbol corresponding to the second category to be displayed on the screen of the display unit; and (b) causing a first device symbol corresponding to each of the at least one first device included in the first category and a second device symbol corresponding to each of the at least one second device included in the second category to be displayed substantially simultaneously but separately in a first area and in a second area on the screen, in response to an instruction to associate the first category symbol with the second category symbol.

In the first device controller and the corresponding first method of displaying a user interface, when the user gives an instruction to associate the first category symbol corresponding to the first category with the second category symbol corresponding to the second category, which are both displayed on the screen of the display unit, first device symbols corresponding to the respective first devices included in the first category and second device symbols corresponding to the respective second devices included in the second category are displayed substantially simultaneously but separately in the first area and in the second area on the screen.

The first device controller or the corresponding first method of displaying a user interface enables the device symbols representing the devices included in the first category and the device symbols representing the devices included in the second category to be displayed simultaneously, when the user requires, for example, data transmission between a desired device included in the first category and another desired device included in the second category. This arrangement enables the user to readily find device symbols representing the desired device included in the first category and the another desired device included in the second category. The user thus readily gives an instruction to start data transmission by associating these device symbols with each other through a mouse operation.

In the specification hereof, the devices represent not only physical devices, such as scanners and printers, but part of the functions attained by the physical devices and software that attains the functions equivalent to those of the physical devices (for example, electronic mail and image processing). The device symbols, the category symbols, and data symbols discussed below may be icons that are pictorial representations of devices, categories, and data, as well as any other user-recognizable representations that can be displayed on the screen, such as letters, figures, symbols, codes, colors corresponding to the devices, categories, and data.

In accordance with one preferable application of the first device controller of the present invention, the user interface display control unit, in response to an external instruction that is input via the input unit to select a desired device symbol out of the displayed first device symbols, causes a data symbol corresponding to each of data kept in a specific first device defined by the desired device symbol, if there is any data in the specific first device, to be displayed in either one of the first area and a third area that is different from the first area on the screen.

When the user gives an instruction to select a desired device symbol among the first device symbols, data symbols corresponding to data kept in a specific device defined by the desired device symbol are displayed, if there is any data in the specific device. This arrangement enables the user to readily find data kept in the device. The data symbol may be displayed in the first area, where the first device symbols are displayed, or in a third area that is different from the first area.

The present invention is further directed to a second-device controller that is capable of controlling a first device and at least one second device included in a specific category. The second device controller includes: an input unit that inputs an external instruction; and a user interface display control unit that causes a first device symbol corresponding to the first device and a category symbol corresponding to the specific category to be displayed on a screen of a display unit. The user interface display control unit causes a data symbol corresponding to each of data kept in the first device, if there is any data in the first device, and a device symbol corresponding to each of the at least one second device included in the specific category to be displayed substantially simultaneously but separately in a first area and in a second area on the screen, in response to an external instruction that is input via the input unit to associate the displayed first device symbol with the displayed category symbol.

The present invention is also directed to a second method of displaying a user interface on a screen of a display unit to enable operation of a first device and at least one second device included in a specific category. The second method includes the steps of: (a) causing a first device symbol corresponding to the first device and a category symbol corresponding to the specific category to be displayed on the screen of the display unit; and (b) causing a data symbol corresponding to each of data kept in the first device, if there is any data in the first device, and a device symbol corresponding to each of the at least one second device included in the specific category to be displayed substantially simultaneously but separately in a first area and in a second area on the screen, in response to an instruction to associate the displayed first device symbol with the displayed category symbol.

In the second device controller and the corresponding second method of displaying a user interface, when the user gives an instruction to associate the first device symbol corresponding to the first device with the category symbol corresponding to the specific category, which are both displayed on the screen of the display unit, data symbols corresponding to the respective data kept in the first device and device symbols corresponding to the respective second devices included in the specific category are displayed substantially simultaneously but separately in the first area and in the second area on the screen.

The second device controller or the corresponding second method of displaying a user interface enables the data symbols representing the data kept in a certain first device and the device symbols representing the devices included in the specific category to be displayed simultaneously, when the user wants to transmit the data kept in the certain first device to a desired device included in the specific category. This arrangement enables the user to readily find a data symbol corresponding to desired data, which is to be transferred, and a device symbol corresponding to the desired device, which is to receive the transferred data. The user thus readily gives an instruction to start data transmission by associating the data symbol with the device symbol through a mouse operation.

In the first or the second device controller of the present invention, it is preferable that one of the first device and the second device is an input device that is capable of at least inputting information, and the other is an output device that is capable of at least outputting information.

Data is transmitted from the input device to the output device. In the specification hereof, the input device represents a device that is capable of at least inputting information, and the output device represents a device that is capable of at least outputting information. When an intermediate device that performs intermediate processing is capable of at least inputting information, the intermediate device is regarded as an input device. When the intermediate device is capable of at least outputting information, the intermediate device is regarded as an output device. Namely the intermediate device may be an input device or an output device.

The present invention is also directed to a first computer-readable recording medium in which a specific computer program is recorded. The specific computer program causes a user interface to be displayed on a screen of a display unit connecting with a computer. The user interface enables operation of at least one first device included in a first category and at least one second device included in a second category. The specific computer program causes the computer to attain the functions of: causing a first category symbol corresponding to the first category and a second category symbol corresponding to the second category to be displayed on the screen of the display unit; and causing a first device symbol corresponding to each of the at least one first device included in the first category and a second device symbol corresponding to each of the at least one second device included in the second category to be displayed substantially simultaneously but separately in a first area and in a second area on the screen, in response to an external instruction that is input into the computer to associate the first category symbol with the second category symbol.

The computer executes the specific computer program recorded in the first recording medium, so as to attain the functions equivalent to those of the user interface display control unit of the first device controller. Namely the first recording medium exerts the similar effects to those of the first device controller.

The present invention is further directed to a second computer-readable recording medium in which a specific computer program is recorded. The specific computer program causes a user interface to be displayed on a screen of a display unit connecting with a computer. The user interface enables operation of a first device and at least one second device included in a specific category. The specific computer program causes the computer to attain the functions of: causing a first device symbol corresponding to the first device and a category symbol corresponding to the specific category to be displayed on the screen of the display unit; and causing a data symbol corresponding to each of data kept in the first device, if there is any data in the first device, and a device symbol corresponding to each of the at least one second device included in the specific category to be displayed substantially simultaneously but separately in a first area and in a second area on the screen of the display unit, in response to an external instruction that is input into the computer to associate the displayed first device symbol with the displayed category symbol.

The computer executes the specific computer program recorded in the second recording medium, so as to attain the functions equivalent to those of the user interface display control unit of the second device controller. Namely the second recording medium exerts the similar effects to those of the second device controller.

BRIEF DESCRIPTION OF THE DRAWINGS

FIG. 8 is a flowchart showing a routine of a third user interface display process executed by the application unit 112 shown in FIG. 1;

BEST MODES OF CARRYING OUT THE INVENTION

Figure 1:
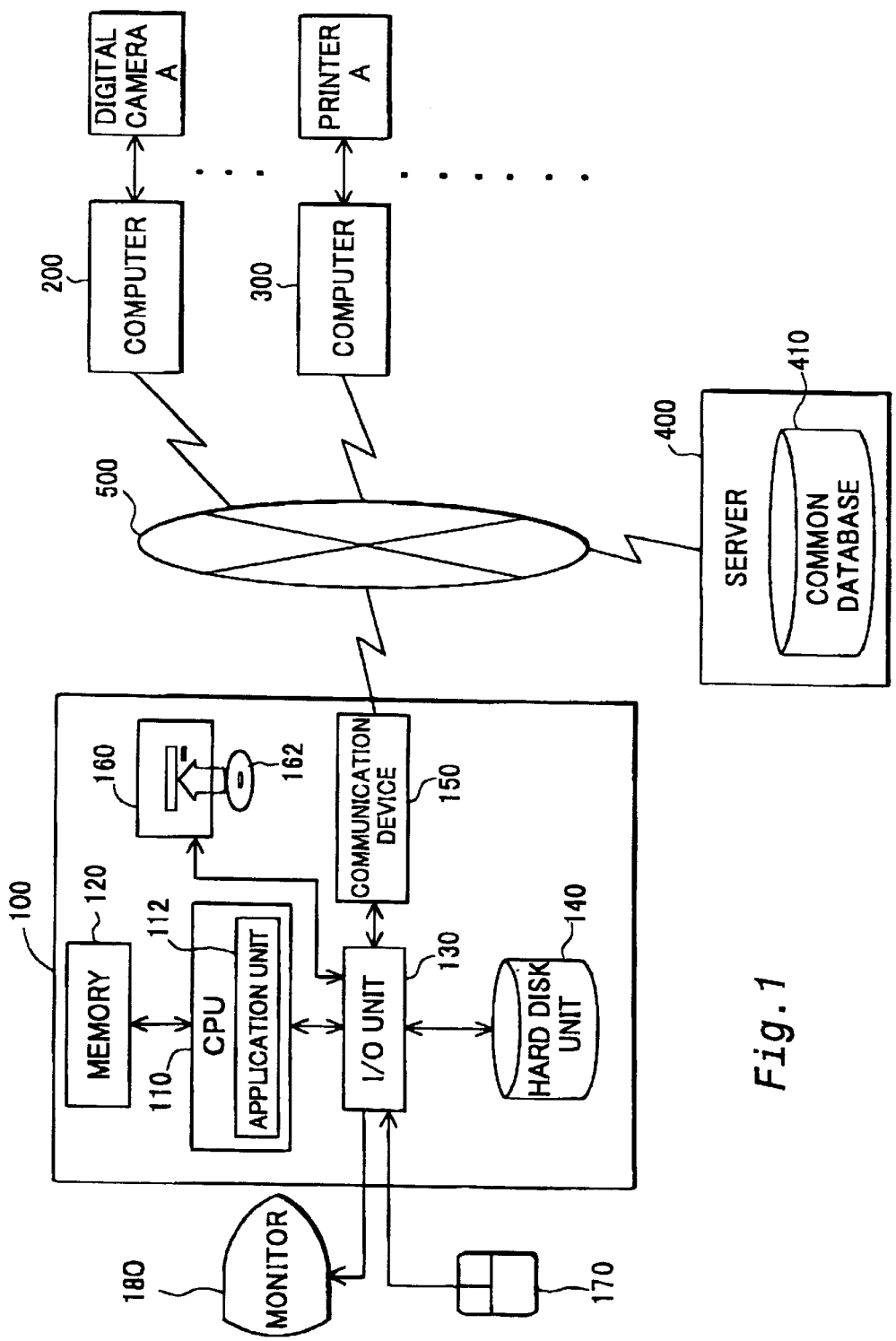
FIG. 1 is a block diagram illustrating a device controller in one embodiment of the present invention.

One mode of carrying out the present invention is described below as a preferred embodiment. FIG. 1 is a block diagram illustrating a device controller in one embodiment of the present invention, As shown in FIG. 1, a computer 100 functioning as the device controller of the embodiment is connected to a computer 200 connecting with a digital camera A as an input device, a computer 300 connecting with a printer A as an output device, and a server 400 having a common database 410 via a network 500. The term 'computer' here includes a diversity of computers, such as a personal computer, a mobile computer, an information processing terminal, and a work station, peripheral equipment substantially having the functions of the computer like a copying machine and a printer, and a set top box (an information terminal like a receiver terminal of Web TV) having the functions of the computer. The network 500 may be the Internet, an intranet, a local area network (LAN), a wide area network (WAN), or any other suitable network.

Referring to FIG. 1, the computer 100 includes: a CPU 110 that carries out a variety of processes and controls according to computer programs; a memory 120 in which the computer programs are stored and working data are temporarily registered; an I/O unit 130 that transmits data to and from a diversity of peripheral devices; a hard disk unit 140 in which a variety of data are stored; a communication device 150 that is, for example, a modem, a terminal adapter, or a network card and communicates with the other devices via the network; a CD-ROM drive 160; a mouse 170 that is operated to input user's instructions and the like; and a monitor 180 that is, for example, a CRT or a liquid crystal display and is capable of displaying user interfaces and a diversity of other images.

The CPU 110 in the computer 100 reads and executes a desired computer program stored in the memory 120, thus functioning as an application unit 112.

In this embodiment, the computer programs stored in the memory 120 are provided in the form of being recorded in a CD-ROM 162 as a recording medium and read by the CD-ROM drive 160 to be taken into the computer 100. The input computer programs are transferred to the hard disk unit 140 and subsequently to the memory 120 according to the requirements, for example, at the time of activation. The input computer programs may alternatively be transferred to the memory 120 not via the hard disk unit 140 but directly.

In this embodiment, the CD-ROM is used as the recording media, in which the computer programs are recorded in a computer readable manner. Other examples of the available recording medium include flexible disks, magneto-optic discs, IC cards, ROM cartridges, punched cards, prints with barcodes or other codes printed thereon, internal storage devices (memories like a RAM and a ROM) and external storage devices of the computer, and a diversity of other computer readable media.

The computer programs may otherwise be taken into the computer 100 from a program server (not shown) that is accessed via the network 500 and works as a supplier of computer programs.

Part of the computer programs may be incorporated in the operating system.

The application unit 112, which is attained by the software in this embodiment, may be actualized by the hardware.

Information regarding a large number of devices (for example, the digital camera A and the printer A) that are present on the network 500 are registered in the common database 410 incorporated in the server 400. More specifically, the registered pieces of information are those required to utilize the respective devices via the network 500, for example, the names of the respective devices, the names of categories (that is, device classes) which the respective devices belong to, functions of the respective devices, and data of icons corresponding to the respective devices and the respective categories.

When each device is connected to a mating computer on the network 400, these pieces of information are registered in the common database 410 incorporated in the server 400 according to a predetermined format by the mating computer.

The server 400 makes all the pieces of devices-relating information registered in the common database 410 open to the network 500. This enables the computer 100 or any other computer on the network 500 to freely obtain and utilize the registered pieces of information regarding the devices. One possible modification adds some restriction to the openness and allows only one or plural specific computers on the network 500 to gain access to the registered pieces of information.

For example, a directory service used on Windows NT, which is a network OS manufactured by Microsoft Corporation, may be utilized to make the information open to the public on the network 500 and allow any computer on the network 500 to gain access to the information. In the case where the server 400 functions as a domain controller, the directory service enables any computer on the network 500 to refer to the information registered in the common database 410.

In this embodiment, the devices-relating information is registered in the specific computer or server 400. The principle of the present invention is, however, not restricted to this arrangement. The information may be registered in any of the computers 100, 200, and 300 present on the network 500 or any other computer as long as the computer is able to make the information open to the public on the network 500. With a view to improving the operation speed or with a view to temporarily narrowing an available range of devices, the computer 100 as the device controller may copy in advance all or part of the devices-relating information from the common database 410 of the server 400 into the hard disk unit 140 thereof and refer to the copied information.

Figure 2:
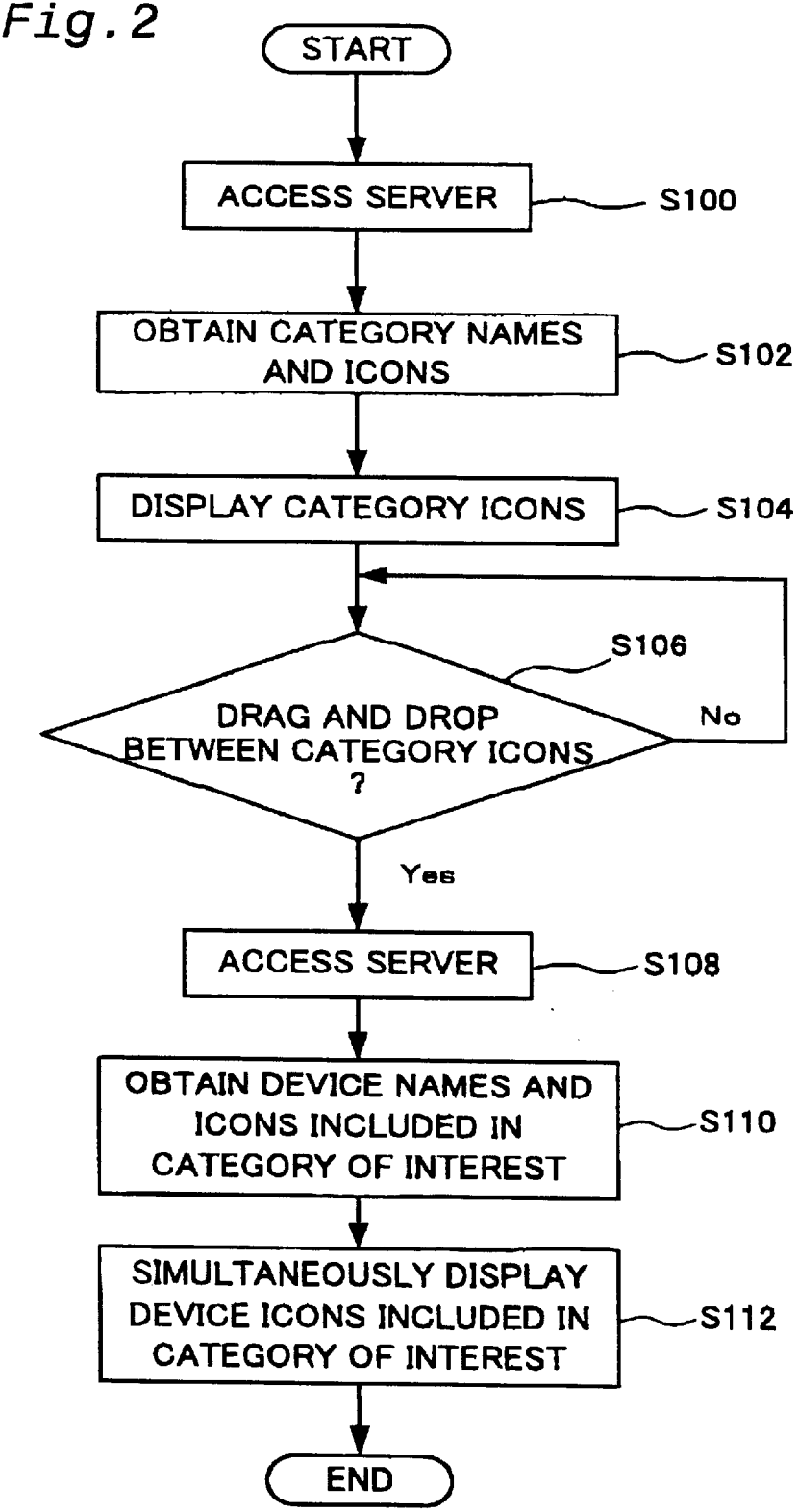
FIG. 2 is a flowchart showing a routine of a first user interface display process executed by an application unit 112 shown in FIG. 1.
Figure 3:
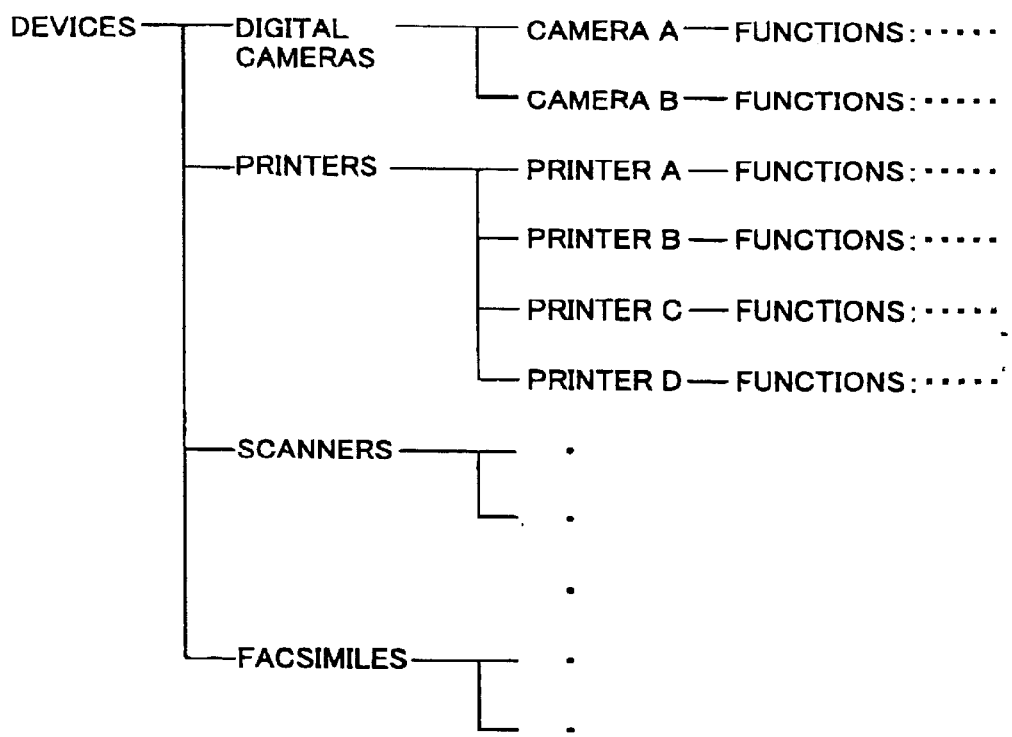
FIG. 3 shows an example of devices-relating information stored in a common database 410 shown in FIG. 1.

A first user interface display process executed in this embodiment is described with referring to FIGS. 2 through 4.

FIG. 2 is a flowchart showing a routine of the first user interface display process executed by the application unit 112 shown in FIG. 1.

When the program enters the processing routine shown in FIG. 2, the application unit 112 in the computer 100 gains access to the server 400 connected to the network 500 via the I/O unit 130 and the communication device 150 (step S100). The application unit 112 then obtains data regarding the names of categories (that is, device classes) which the respective devices present on the network 500 belong to and icons corresponding to the categories, out of the pieces of information registered in the common database 410 incorporated in the server 400 (step S102) and: stores the obtained data into the hard disk unit 140 via the I/O unit 130.

FIG. 3 shows an example of the devices-relating information registered in the common database 410 shown in FIG. 1. As described previously, the information relating to the respective devices present on the network 500 is registered in the common database 410, for example, in a tree structure shown in FIG. 3. Pieces of information regarding the names of categories (that is, device classes) which the respective devices belong to are registered in a first layer of the tree structure. In a concrete example, digital cameras, printers, scanners, and facsimiles are registered in the first layer as the names of the categories of the respective devices present on the network 500. Pieces of information regarding the names of the individual devices present on the network 500 are registered in a second layer. In a concrete example, digital camera A, digital camera B, printer A, printer B , . . . are registered in the second layer as the names of the individual devices present on the network 500. Pieces of information regarding the functions of the individual devices are registered in a third layer.

The processing of step S102 accordingly obtains the names of the respective categories from the first-layer information registered in the common database 410. More specifically, the names of the categories 'Digital Cameras', 'Printers','Scanners', and 'Facsimiles' are obtained here.

Figure 4A:
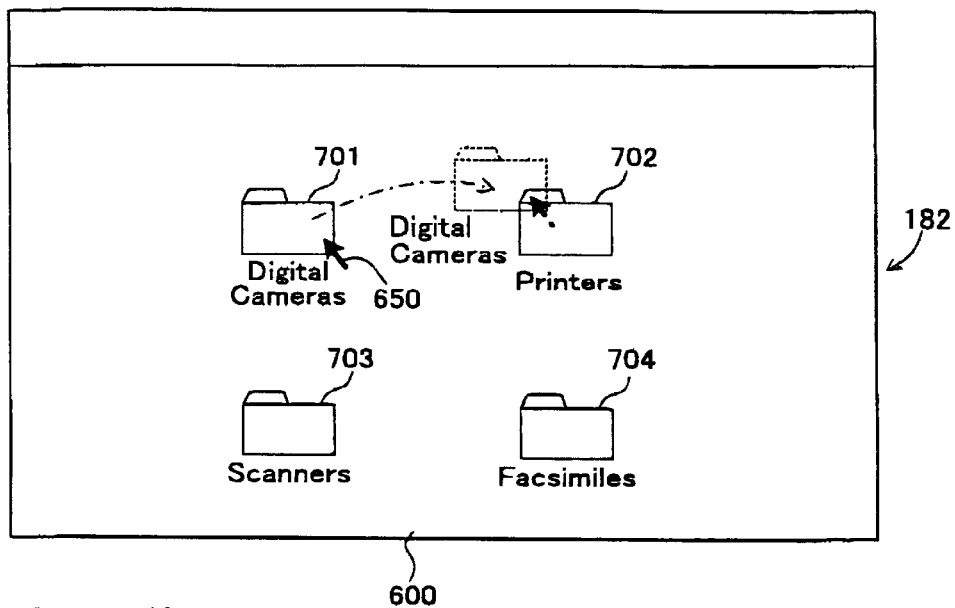
FIG. 4 shows a user interface displayed on a screen of a monitor 180 by the display process of FIG. 2.

The application unit 112 subsequently causes category ions to be displayed on the screen of the monitor 180 via the I/O unit 130 as shown in FIG. 4(a), based on the obtained data regarding the names of the respective categories and the corresponding icons (step S104).

FIG. 4 shows a user interface displayed on the screen of the monitor 180 by the display process of FIG. 2.

In accordance with a concrete procedure, as shown in FIG. 4(a), the application unit 112 causes a digital camera category icon 701, a printer category icon 702, a scanner category icon 703, and a facsimile category icon 704 to be displayed in an icon display window 600 on a screen 182 of the monitor 180 as icons of the categories (that is, the device classes) which the respective devices present on the network 500 belong to.

In this state of display, the user operates the mouse 170, in order to transfer data from a digital camera as an input device to a printer as an output device. In accordance with a concrete procedure, the user first locates a mouse cursor 650 displayed on the screen 182 onto the digital camera category icon 701, subsequently drags the digital camera category icon 701 as shown by the one-dot chain line with pressing a button on the mouse 170, and drops the dragged digital camera category icon 701 onto the printer category icon 702. The application unit 112 then determines via the I/O unit 130 that the drag and drop action associates the digital camera category icon 701 with the printer category icon 702 (step S106).

The application unit 112 gains access again to the server 400 (step S108), obtains data regarding the names of individual devices included in the digital camera category (that is, the individual digital cameras present on the network 500), data regarding the names of individual devices included in the printer category (that is, the individual printers present on the network 500), and data regarding icons corresponding to the respective devices, out of the pieces of information registered in the common database 410 incorporated in the server 400 (step S110), and stores the obtained data into the hard disk unit 140.

The processing of step S110 accordingly obtains the names of the digital cameras and printers from the second layer information registered in the common database 410 as shown in FIG. 3. More specifically, 'Digital Camera A' and 'Digital Camera B' as the names of the digital cameras and 'Printer A','Printer B','Printer C', and 'Printer D' as the names of the printers are obtained here.

Figure 4B:
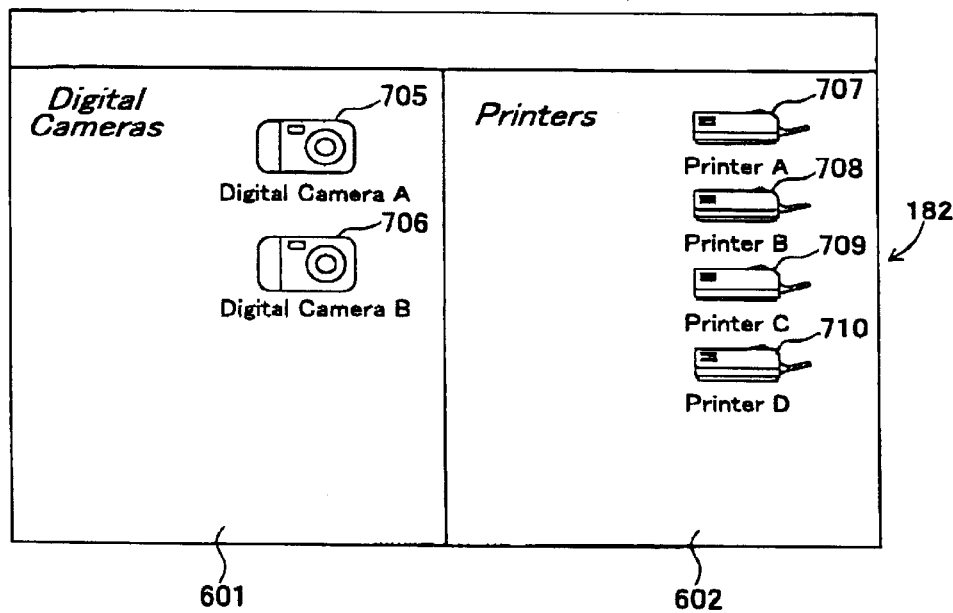

The application unit 112 then causes device icons of the digital cameras and the printers to be displayed simultaneously on the screen 182 of the monitor 180 as shown in FIG. 4(b), based on the obtained data regarding the names of the digital cameras and printers and the corresponding icons (step S112).

In accordance with a concrete procedure, as shown in FIG. 4(b), the application unit 112 opens a digital camera category window 601 and a printer category window 602 on the screen 182 of the monitor 180. Icons 705 and 706 of the digital cameras A and B as device icons of the digital cameras and icons 707 through 710 of the printers A through D as device icons of the printers are displayed simultaneously but separately in the digital camera category window 601 and in the printer category window 602.

Such simultaneous and separate display of the digital camera icons in the digital camera category window 601 and the printer icons in the printer category window 602 enables the user to see the digital cameras and the printers present on the network 500 at a glance. When the user selects a desired digital camera and a desired printer among the possible choices and drags and drops the icon of the selected digital camera onto the icon of the selected printer, an instruction to transfer data from the selected digital camera to the selected printer is immediately given to the computer 100.

Figure 5:
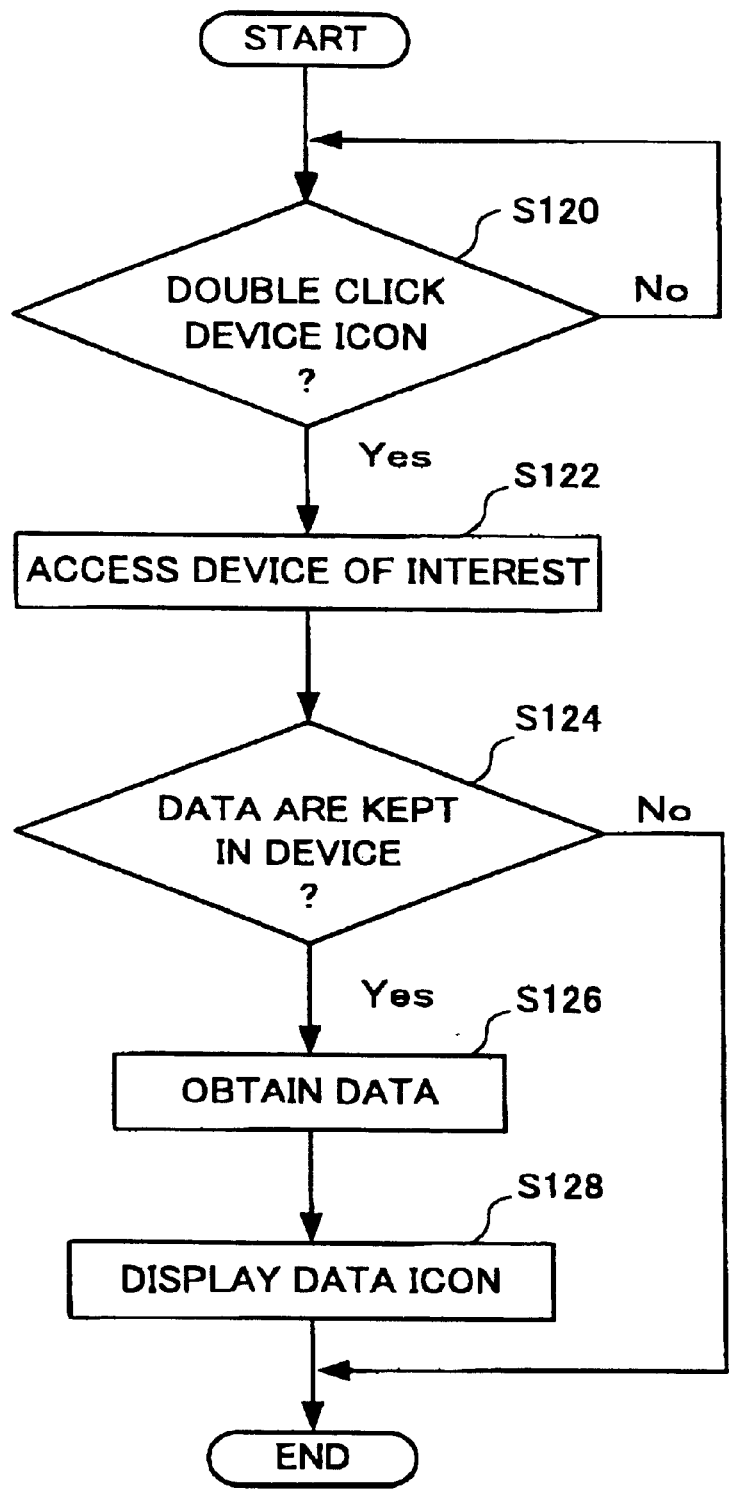
FIG. 5 is a flowchart showing a routine of a second user interface display process executed by the application unit 112 shown in FIG. 1.
Figure 6A:
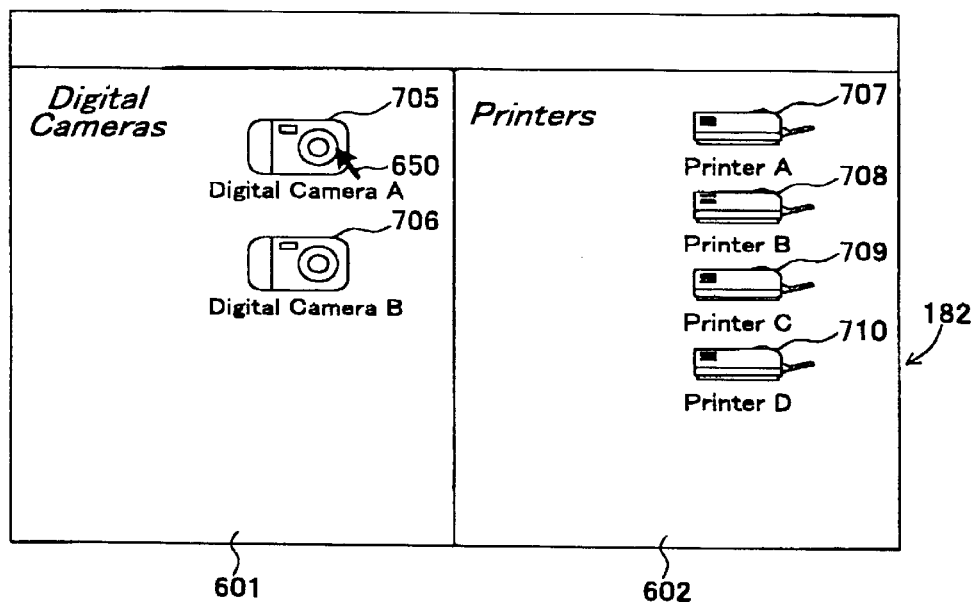
FIG. 6 shows a user interface displayed on the screen 182 of the monitor 180 by the display process of FIG. 5.
Figure 6B:
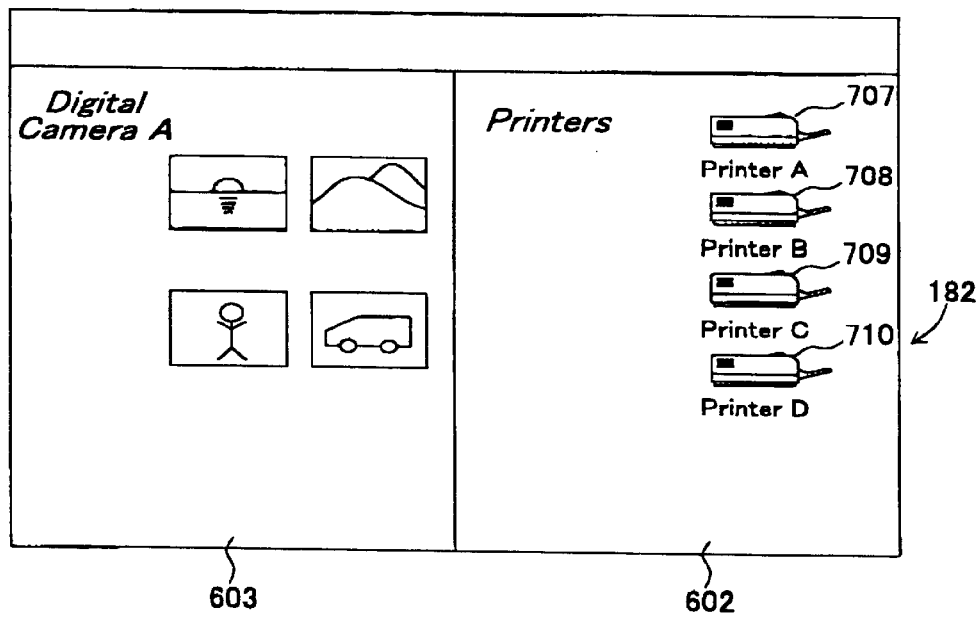
Figure 7:
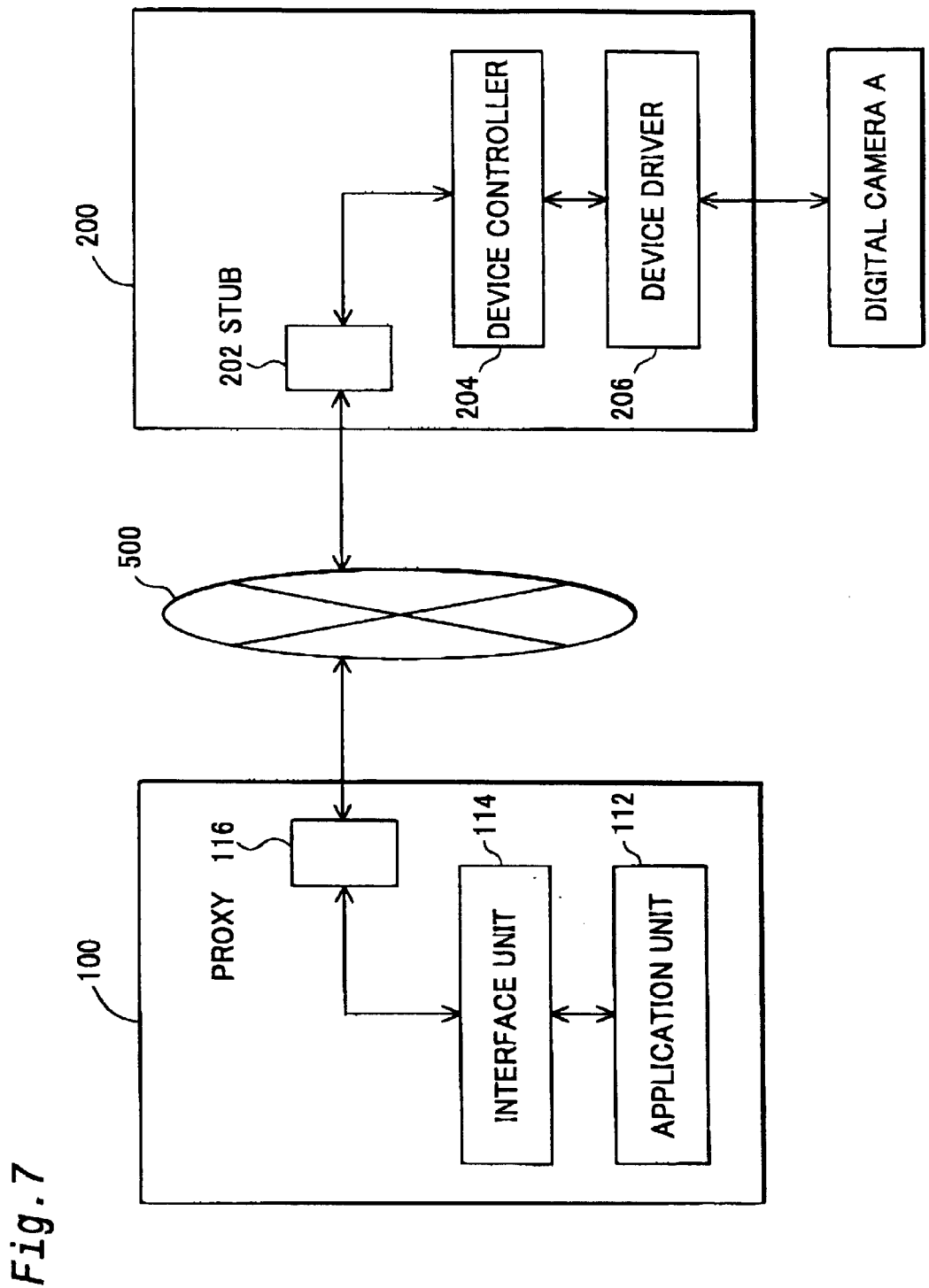
FIG. 7 is a block diagram illustrating an arrangement when the application unit 112 shown in FIG. 1 gains access to a device via a network 500 and obtains data.

The following describes a second user interface display process executed in this embodiment with referring to FIGS. 5 through 7.

FIG. 5 is a flowchart showing a routine of the second user interface display process executed by the application unit 112 shown in FIG. 1. FIG. 6 shows a user interface displayed on the screen 182 of the monitor 180 by the display process of FIG. 5.

The current display on the screen 182 of the monitor 180 shown in FIG. 6(a) is identical with the display shown in FIG. 4(b). In this state of display, the user operates the mouse 170, in order to see images stored in a desired digital camera. In accordance with a concrete procedure, the user double clicks the icon 705 of the digital camera A as a desired digital camera out of the icons of the digital cameras displayed in the digital camera category window 601. Here the application unit 112 determines via the I/O unit 130 that the icon 705 of the digital camera A is selected for activation by the double-click (step S120).

The application unit 112 then gains access to the digital camera A present on the network 500 (step S122) and determines whether or not any data are kept in the digital camera A (step S124). When any data are kept in the digital camera A, the application unit 112 reads the data from the digital camera A (step S126) and stores the obtained data into the hard disk unit 140.

With referring to FIG. 7, the following describes a process in which the application unit 112 gains access to the digital camera A as a device and obtains data.

FIG. 7 is a block diagram illustrating an arrangement when the application unit 112 shown in FIG. 1 gains access to a device via the network 500 and obtains data.

As described above, in response to the double-click of the icon 705 of the digital camera A, an interface unit 114 and a proxy 116 are generated corresponding to the digital camera A in the computer 100. A stub 202 is then generated corresponding to the proxy 116 in the computer 200 connecting with the digital camera A.

The CPU 110 of the computer 100 gives an instruction to generate a device controller 204 corresponding to the digital camera A to the computer 200 via the network 500. In response to this instruction, the device controller 204 corresponding to the digital camera A is generated in the computer 200.

A device driver 206 corresponding to the digital camera A has been provided in advance in the computer 200 when the digital camera A is connected to the computer 200.

In this embodiment, the interface unit 114, the device controller 204, the proxy 116, and the stub 202 are actualized by the COM-based technologies.

COM (component object model) is an infrastructure developed and proposed by Microsoft Corporation to provide a framework for integrating objects. COM defines a method of building dynamically replaceable components and specifies the standard of the component architecture.

In the COM-based technologies, each service provided by the software is implemented as a COM object. Each COM object defines at least one interface. In this embodiment, the interface unit 114 and the device controller 204 are built as COM objects.

The proxy 116 and the stub 202 are, on the other hand, built by the mechanism of COM/DCOM (distributed COM). COM/DCOM is a mechanism generally supported by, for example, the Windows platform.

The interface defined by the COM object generally includes a plurality of methods having some associations with each other. Each interface is identified by an interface ID. The method is a function call for executing a specific function. A pointer to a specific interface is required to call a method included in the specific interface. The pointer to the specific interface is obtained by specifying the interface ID for identifying the specific interface and a class ID for identifying a COM object, which defines the specific interface, and by calling a COM library service.

The interface unit 114 and the proxy 116 generated in the computer 100 and the stub 202 and the device controller 204 generated in the computer 200 connecting with the digital camera A as described above are automatically activated. This results in mutual connection of the application unit 112, the interface unit 114, and the proxy 116 in the computer 100, the network 500, the stub 202, the device controller 204 and the device driver 206 in the computer 200, and the digital camera A linked with the computer 200 as shown in FIG. 7. A communication path is accordingly established from the application unit 112 via the network 500 to the digital camera A as a device. This allows the application unit 112 to freely control and utilize the digital camera A via the network 500.

The proxy 116 and the stub 202 perform abstraction of the communication path that connects the computer 100 with the computer 200 via the network 500, relative to the upper-level application unit 112 and interface unit 114, when the application unit 112 transmits a diversity of control information and data to and from the digital camera A across the network 500. Namely the proxy 116 and the stub 202 absorb the difference in type of the interposing communication path and enable the application unit 112 to carry out transmission of control information and data without differentiating the communication path connecting different computers with each other across a network boundary from the communication path connecting different processes with each other across a process boundary in an identical computer.

The device controller 204, on the other hand, absorbs the difference in device class (type of the device) of the corresponding device (in this case, the digital camera A) and performs abstraction of the device (abstraction of the hardware) relative to the application unit 112 and the interface unit 114 located on the upper level.

The device driver 206, which is located on the lower level than that of the device controller 204, absorbs the difference between individual devices and performs abstraction of the device to the level of the difference in device class relative to the constituents located on the upper level. (In one example, it is assumed that the devices include a digital camera manufactured by X Corp. and a digital camera manufactured by Y Corp. When both the digital cameras belong to an identical device class, that is, a digital camera class, the device driver does not differentiate the digital camera manufactured by X Corp. from the digital camera manufactured by Y Corp. but causes the constituents located on the upper level to recognize these digital cameras as the devices included in the same device class.) This, however, still leaves a difference between the devices included in the digital camera class and the devices included in a printer class. The device controller 204 here absorbs such difference in device class and causes the application unit 112 and all the other constituents located on the upper level to recognize all the devices as a single device including all the functions of the devices.

In this embodiment, the device controller 204 provides an identical interface for the application unit 112 and all the other constituents located on the upper level, so as to implement complete abstraction of the device.

In a very simple example, the following functions may be provided by a common interface (general-purpose interface).

Outputting data (data stream, data type)

Inputting data (data stream, data type)

Obtaining device status (status ID, status value)

Setting device status (status ID, status value)

Obtaining device attribute (attribute ID, attribute value)

Setting device attribute (attribute ID, attribute value) Examples of parameters are given in brackets.

When the device controller 204 unifies the interface relative to the application unit 112 and all the other constituents located on the upper level, there may be meaningless controls (functions) in some device classes. The application unit 112 pre-checks the properties of the device and specifies appropriate control for the device.

In the above manner, the application unit 112 obtains data kept in the digital camera A via the network 500 and stores the obtained data into the hard disk unit 140. The application unit 112 subsequently reads out the stored data, carries out a skipping process to generate data of thumbnail images, and causes data icons to be displayed on the screen of the monitor 180 as shown in FIG. 6(b), based on the data of the thumbnail images (step S128).

In accordance with a concrete procedure, the application unit 112 newly opens a device window 603 of the digital camera A on the screen 182 of the monitor 180 and causes data icons corresponding to all the data kept in the digital camera A to be displayed in the device window 603 as shown in FIG. 6(b).

The arrangement of opening the device window 603 of the digital camera A and displaying data icons corresponding to all the data kept in the digital camera A enables the user to see all the image data kept in the digital camera A at a glance.

The following describes a third user interface display process executed in this embodiment with referring to FIGS. 8 and 9.

FIG. 8 is a flowchart showing a routine of the third user interface display process executed by the application unit 112 shown in FIG. 1. FIG. 9 shows a user interface displayed on the screen 182 of the monitor 180 by the display process of FIG. 8.

Figure 9A:
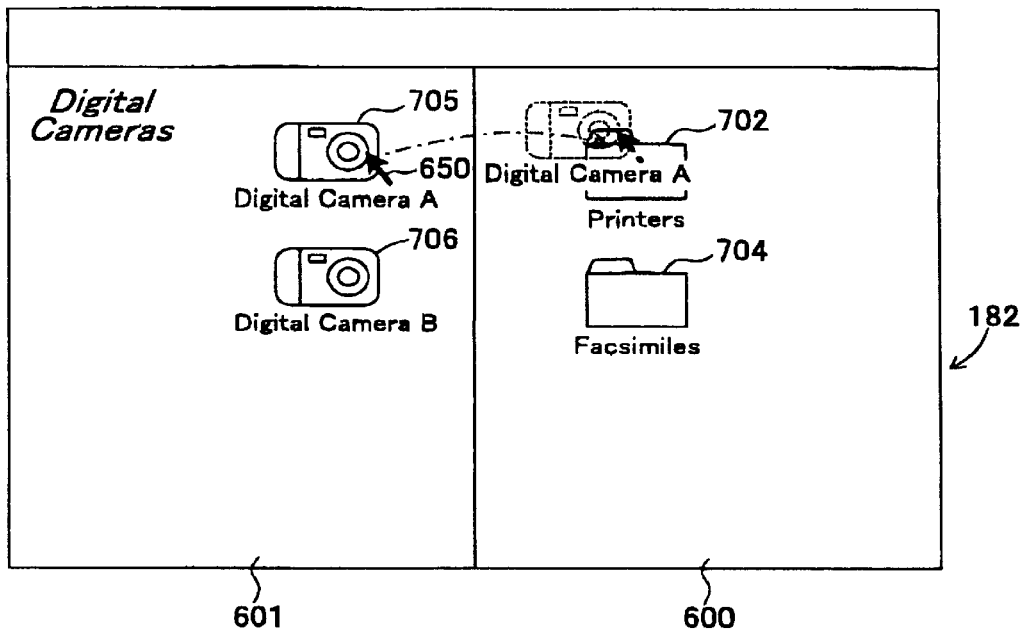
FIG. 9 shows a user interface displayed on the screen 182 of the monitor 180 by the display process of FIG. 8.

In an example shown in FIG. 9(a), the printer category icon 702 and the facsimile category icon 704 are displayed in the icon display window 600 as the icons of the categories of the respective devices present on the network 500. The icons 705 and 706 of the digital cameras A and B are displayed in the digital camera category window 601 as the device icons of the digital cameras. In this state of display, the user operates the mouse 170, in order to transfer data from a desired digital camera to a printer. In accordance with a concrete procedure, the user locates the mouse cursor 650 displayed on the screen 182 onto the icon 705 of the digital camera A as the desired digital camera, subsequently drags the icon 705 of the digital-camera A as shown by the one-dot chain line with pressing a button on the mouse 170, and drops the dragged icon 705 of the digital camera A onto the printer category icon 702. The application unit 112 then determines via the I/O unit 130 that the drag and drop action associates the icon 705 of the digital camera A with the printer category icon 702 (step S150). In the description below, the device that is the object of association (that is, the digital camera A) may be referred to as the device of interest, and the category that is the object of association (that is, the printer category) may be referred to as the category of interest.

The application unit 112 gains access to the server 400 present on the network 500 via the I/O unit 130 and the communication device 150 (step S152), obtains data regarding the names of individual devices included in the printer category or the category of interest (that is, the individual printers present on the network 500) and icons corresponding to the respective devices, out of the pieces of information registered in the common database 410 incorporated in the server 400 (step S154), and stores the obtained data into the hard disk unit 140. The processing of step S140 accordingly obtains 'Printer A','Printer B','Printer C', and'Printer D' as the names of the printers from the second layer information registered in the common database 410 as shown in FIG. 3.

The application unit 112 subsequently gains access to the digital camera A or the device of interest present on the network 500 via the I/O unit 130 and the communication device 150 (step S156), and determines whether or not any data are kept in the digital camera A (step S158). When any data are kept in the digital camera A, the application unit 112 reads the data from the digital camera A (step S160) and stores the obtained data into the hard disk unit 140. The application unit 112 accesses the digital camera A or the device of interest to obtain data according to the process that is identical with the process described previously with FIG. 7 and is thus not specifically described here.

Figure 9B:
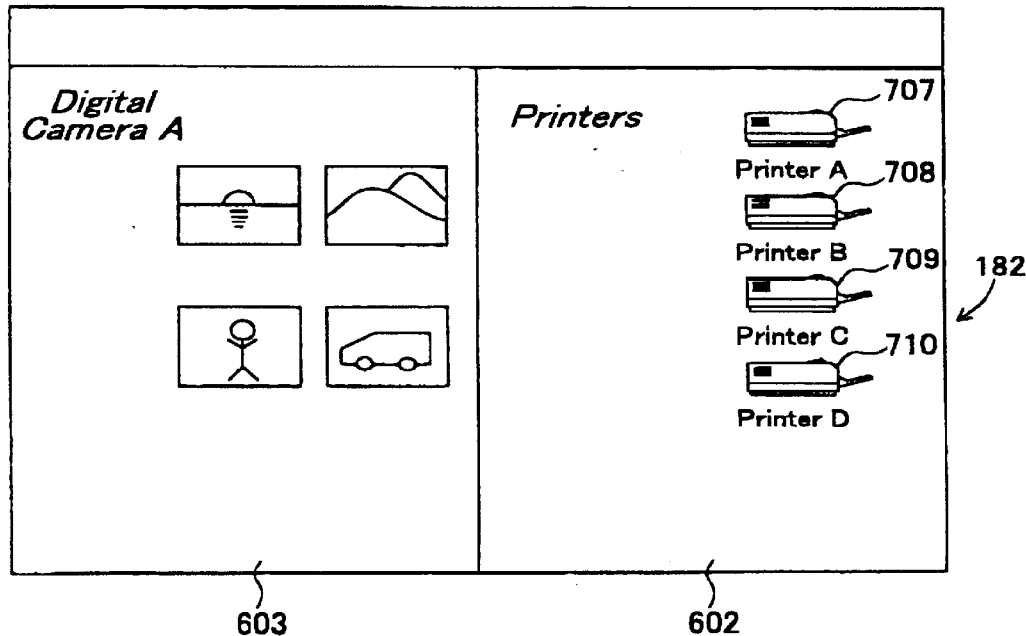

The application unit 112 then reads out the stored data, carries out a skipping process to generate data of thumbnail images, and causes data icons, based on the data of the thumbnail images, and device icons of the printers, based on the data regarding the names of the printers and the corresponding icons obtained at step S154, to be displayed on the screen 182 of the monitor 180 as shown in FIG. 9(b) (step S162).

In accordance with a concrete procedure, the application unit 112 opens the device window 603 of the digital camera A and the printer category window 602 on the screen 182 of the monitor 180 and causes data icons corresponding to all the data kept in the digital camera A and the icons 707 through 710 of the printers A through D as the device icons of the printers to be displayed simultaneously but separately in the device window 603 of the digital camera A and in the printer category window 602 as shown in FIG. 9(b).

When no data are kept in the digital camera A at step S158, on the other hand, the application unit 112 newly opens only the printer category window 602 on the screen 182 of the monitor 180 and causes the icons 707 through 710 of the printers A through D to be displayed in the printer category window 602 as the device icons of the printers as shown in FIG. 4(b) (step S164). In this case, the display in the digital camera category window 601 is kept unchanged.

Such simultaneous and separate display of the data icons corresponding to all the data kept in the digital camera A in the device window 603 of the digital camera A and the printer icons corresponding to the printers present on the network 500 in the printer category window 602 as shown in FIG. 9(b) enables the user to see images kept in the desired digital camera, that is, the digital camera A, and the printers present on the network 500 at a glance. When the user selects a desired image and a desired printer among the possible choices and drags and drops the data icon of the selected image onto the icon of the selected printer, an instruction to transfer data of the selected image from the digital camera A to the selected printer is immediately given to the computer 100.

In the example of FIG. 9(a), the user drags and drops the device icon of a desired digital camera (that is, the icon 705 of the digital camera A) displayed in the digital camera category window 601. One possible modification may drag and drop a shortcut device icon, instead of the device icon.

Figure 10:
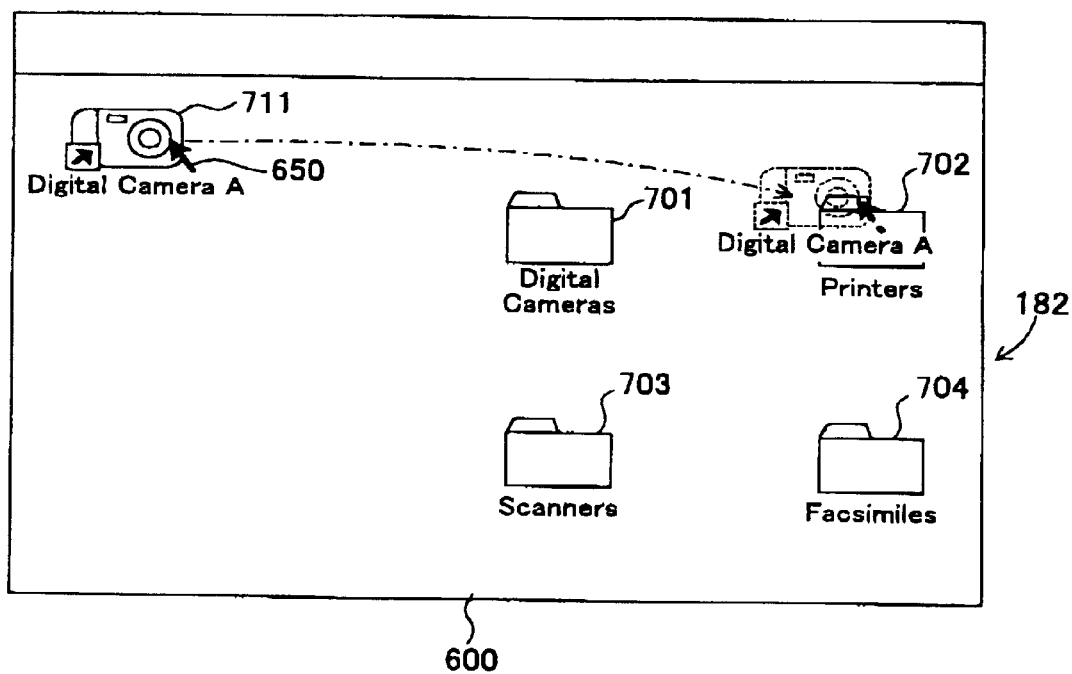
FIG. 10 shows an action of dragging and dropping a shortcut device icon.

FIG. 10 shows an action of dragging and dropping a shortcut device icon. In an example of FIG. 10, a shortcut device icon 711 of the digital camera A, as well as the digital camera category icon 701, the printer category icon 702, the scanner category icon 703, and the facsimile category icon 704 as the icons of the categories which the respective devices present on the network 500 belong to are displayed in the icon display window 600 on the screen 182 of the monitor 180. The device icon 705 of the digital camera A is originally displayed in the digital category window 601 as shown in FIG. 9(a). In the state of display shown in FIG. 10, however, the shortcut device icon 711 that is a duplicate of the device icon 705 is displayed in the icon display window 600.

In this state of display, the user operates the mouse 170, in order to transfer data from a desired digital camera to a printer. In accordance with a concrete procedure, the user locates the mouse cursor 650 displayed on the screen 182 onto the shortcut device icon 711 of the digital camera A, subsequently drags the shortcut device icon 711 of the digital camera A as shown by the one-dot chain line with pressing a button on the mouse 170, and drops the dragged shortcut device icon 711 of the digital camera A onto the printer category icon 702. The application unit 112 then determines that the drag and drop action associates the shortcut device icon 711 of the digital camera A with the printer category icon 702, and carries out the processing of and after step S152 in the flowchart of FIG. 8.

Using the shortcut device icon, which is the duplicate of the device icon, in place of the device icon ensures the similar display process. This technique is also applicable for the category icons and the data icons discussed above.

The present invention is not restricted to the above embodiment or its modifications, but there may be many other modifications, changes, and alterations without departing from the scope or spirit of the main characteristics of the present invention.

In the embodiment discussed above, the icons are displayed in alignment in the window on the screen 182 of the monitor 180. The icons may alternatively be displayed in a tree structure in the window.

The display of icons may be replaced with the display of only letters representing the category names, the device names, and the data names or with the display of figures, symbols, codes, or colors corresponding to these names.

In the embodiment discussed above, the interface unit 114, the device controller 204, the proxy 116, and the stub 202 are actualized by the COM-based technologies. Similar mechanisms may, however, be actualized by utilizing any specification of building similar discrete objects other than COM, for example, JAVA or CORBA.

INDUSTRIAL APPLICABILITY

The principle of the present invention is industrially applicable to a computer connecting with a plurality of devices and a computer network system with a plurality of devices present thereon.

What is claimed is:

1. A device controller that is capable of controlling at least one first device included in a first category and at least one second device included in a second category, said device controller comprising:

an input unit that inputs an external instruction; and a user interface display control unit that causes to be displayed on a screen of a display unit a first category symbol corresponding to the first category and a second category symbol corresponding to the second category, wherein, when the displayed first category symbol is associated with the displayed second category symbol with a drag-and-drop technique based on an external instruction input via said input unit, said user interface display control unit causes to be displayed substantially simultaneously but separately in a first area and in a second area on the screen at least one first device symbol corresponding to one of the at least one first device included in the first category and at least one second device symbol corresponding to one of the at least one second device included in the second category.

2. A device controller in accordance with claim 1, wherein, in response to an external instruction that is input via said input unit to select a desired device symbol out of the displayed at least one first device symbols, said user interface display control unit is capable of causing one or more data symbols to be displayed in either one of the first area and a third area that is different from the first area on the screen, the selected desired first device symbol corresponding to a specific first device, the specific first device having at least one data, each of the at least one data symbol corresponding to each of the at least one data.

3. A device controller in accordance with claim 2, wherein one of the first device and the second device is an input device that is capable of at least inputting information, and the other is an output device that is capable of at least outputting information.

4. A device controller in accordance with claim 1, wherein one of the first device and the second device is an input device that is capable of at least inputting information, and the other is an output device that is capable of at least outputting information.

5. A device controller that is capable of controlling a first device and at least one second device included in a specific category, said device controller comprising:

an input unit that inputs an external instruction; and a user interface display control unit that causes to be displayed on a screen of a display unit a first device symbol corresponding to the first device and a category symbol corresponding to the specific category, wherein, when the displayed first device symbol is associated with the displayed category symbol with a drap-and-drop technique based on an external instruction input via said input unit, said user interface display control unit causes to be displayed substantially simultaneously but separately in a first area and in a second area on the screen a data symbol corresponding to a data associated with the first device, and a device symbol corresponding to each of the at least one second device included in the specific category.

6. A device controller in accordance with claim 5, wherein one of the first device and the second device is an input device that is capable of at least inputting information, and the other is an output device that is capable of at least outputting information.

7. A method of displaying a user interface on a screen of a display unit to enable operation of at least one first device included in a first category and at least one second device included in a second category, said method comprising:

(a) causing to be displayed on the screen of said display unit a first category symbol corresponding to the first category and a second category symbol corresponding to the second category; and (b) when the first category symbol is associated with the second category symbol with a drag-and-drop technique, causing to be displayed substantially simultaneously but separately in a first area and in a second area on the screen a first device symbol corresponding to one of the at least one first device included in the first category and a second device symbol corresponding to one of the at least one second device included in the second category.

8. A method of displaying a user interface on a screen of a display unit to enable operation of a first device and at least one second device included in a specific category, said method comprising:
   (a) causing to be displayed on the screen of said display unit a first device symbol corresponding to the first device and a category symbol corresponding to the specific category; and
   (b) when the first category symbol is associated with the second category symbol with a drag-and-drop technique, causing to be displayed substantially simultaneously but separately in a first area and in a second area on the screen a data symbol corresponding to a data associated with the first device, and a device symbol corresponding to one of the at least one second device included in the specific category.

9. A computer-readable recording medium in which a specific computer program is recorded, said specific computer program causing a user interface to be displayed on a screen of a display unit connected with a computer, the user interface enabling operation of at least one first device included in a first category and at least one second device included in a second category, said specific computer program causing the computer to attain the functions of:
   causing to be displayed on the screen of said display unit a first category symbol corresponding to the first category and a second category symbol corresponding to the second category; and
   when the first category symbol is associated with the second category symbol with a drag-and-drop technique based on input instruction, causing to be displayed substantially simultaneously but separately in a first area and in a second area on the screen a first device symbol corresponding to one of the at least one first device included in the first category and a second device symbol corresponding to one of the at least one second device included in the second category.

10. A computer-readable recording medium in which a specific computer program is recorded, said specific computer program causing a user interface to be displayed on a screen of a display unit connected with a computer, the user interface enabling operation of a first device and at least one second device included in a specific category, said specific computer program causing the computer to attain the functions of:
   causing to be displayed on the screen of said display unit a first device symbol corresponding to the first device and a category symbol corresponding to the specific category; and
   when the displayed first device symbol is associated with the displayed category symbol with a drag-and-drop technique based on an input instruction, causing to be displayed substantially simultaneously but separately in a first area and in a second area on the screen of said display unit a data symbol corresponding to a data associated with the first device, and a device symbol corresponding to one of the at least one second device included in the specific category.

* * * * *